US012015632B2

(12) United States Patent
Hanes et al.

(10) Patent No.: US 12,015,632 B2
(45) Date of Patent: Jun. 18, 2024

(54) DYNAMIC RESOURCE ALLOCATION FOR NETWORK SECURITY

(71) Applicant: Cisco Technology, Inc., San Jose, CA (US)

(72) Inventors: David M. Hanes, Lewisville, NC (US); Gonzalo Salgueiro, Raleigh, NC (US); Robert Edgar Barton, Richmond (CA); Sebastian Jeuk, Munich (DE)

(73) Assignee: Cisco Technology, Inc., San Jose, CA (US)

( * ) Notice: Subject to any disclaimer, the term of this patent is extended or adjusted under 35 U.S.C. 154(b) by 213 days.

(21) Appl. No.: 17/390,229

(22) Filed: Jul. 30, 2021

(65) Prior Publication Data

US 2023/0036547 A1 Feb. 2, 2023

(51) Int. Cl.
H04L 9/40 (2022.01)

(52) U.S. Cl.
CPC ...... H04L 63/1433 (2013.01); H04L 63/0236 (2013.01); H04L 63/1425 (2013.01); H04L 63/1466 (2013.01)

(58) Field of Classification Search
CPC ............. H04L 63/1433; H04L 63/0236; H04L 63/1425; H04L 63/1466
See application file for complete search history.

(56) References Cited

U.S. PATENT DOCUMENTS

| 8,370,407 | B1 | 2/2013 | Devarajan et al. |
| 8,826,444 | B1 | 9/2014 | Kalle |
| 10,547,633 | B1 * | 1/2020 | Dell'Amico .......... H04L 41/024 |
| 10,742,591 | B2 | 8/2020 | Nguyen et al. |
| 11,496,519 | B1 * | 11/2022 | Gupta .................. H04L 9/0891 |
| 11,552,953 | B1 * | 1/2023 | Avadhanam .......... H04L 63/102 |
| 2008/0082662 | A1 | 4/2008 | Dandliker et al. |
| 2016/0036848 | A1 * | 2/2016 | Reddy ................. H04L 63/0227 726/22 |
| 2016/0164826 | A1 * | 6/2016 | Riedel ................. H04L 43/0876 709/223 |
| 2016/0373433 | A1 * | 12/2016 | Rivers .................... H04L 9/3265 |
| 2018/0375831 | A1 * | 12/2018 | Kliger ................. H04L 63/0263 |
| 2020/0137126 | A1 | 4/2020 | Yawalkar et al. |
| 2020/0280530 | A1 * | 9/2020 | Kessler .................... H04L 47/50 |
| 2021/0144120 | A1 * | 5/2021 | Wang .................. H04L 61/5061 |

(Continued)

*Primary Examiner* — Stephen T Gundry
(74) *Attorney, Agent, or Firm* — Polsinelli P.C.

(57) ABSTRACT

Systems, methods, and computer-readable media are provided for dynamic allocation of network security resources and measures to network traffic between end terminals on a network and a network destination, based in part on an independently sourced reputation score of the network destination. In one aspect, a method includes receiving, at a cloud network controller, a request from an end terminal for information on a network destination; determining, at the cloud network controller, a reputation score for the network destination; determining, at the cloud network controller, one or more security measures to be applied when accessing the network destination, based on the reputation score; and communicating, by the cloud network controller, the one or more security measures to the end terminal, wherein the end terminal communicates the one or more security measures to a third-party security service provider for applying to communications between the end terminal and the network destination.

19 Claims, 7 Drawing Sheets

(56) References Cited

U.S. PATENT DOCUMENTS

| | | | | |
|---|---|---|---|---|
| 2021/0344651 A1* | 11/2021 | Joshi | H04L 12/4633 |
| 2022/0311837 A1* | 9/2022 | Gupta | H04L 67/10 |
| 2022/0312270 A1* | 9/2022 | Raleigh | H04L 69/18 |
| 2022/0321532 A1* | 10/2022 | Du | H04L 41/0816 |
| 2022/0329459 A1* | 10/2022 | Sundararajan | H04L 12/4666 |
| 2022/0329477 A1* | 10/2022 | Chiganmi | H04L 41/0654 |
| 2022/0345522 A1* | 10/2022 | Kolar | H04L 67/1021 |
| 2022/0353143 A1* | 11/2022 | Hill | H04L 41/0813 |
| 2022/0368676 A1* | 11/2022 | Shribman | H04L 63/029 |
| 2022/0377089 A1* | 11/2022 | Valluri | H04L 61/4511 |
| 2022/0385500 A1* | 12/2022 | Uttaro | H04L 12/4604 |
| 2022/0408255 A1* | 12/2022 | Howe | H04W 12/062 |
| 2022/0417060 A1* | 12/2022 | Sundararajan | H04L 12/66 |
| 2022/0417332 A1* | 12/2022 | Chiganmi | H04L 45/02 |
| 2023/0029079 A1* | 1/2023 | Vemulpali | H04L 63/062 |
| 2023/0029882 A1* | 2/2023 | Hooda | H04L 43/0858 |
| 2023/0030403 A1* | 2/2023 | Jeuk | H04N 21/2347 |
| 2023/0031462 A1* | 2/2023 | Keane | H04L 45/42 |
| 2023/0034615 A1* | 2/2023 | Detienne | H04L 9/0894 |
| 2023/0040365 A1* | 2/2023 | Raleigh | H04W 28/0257 |
| 2023/0075769 A1* | 3/2023 | Cherian | H04L 12/4633 |
| 2023/0103683 A1* | 4/2023 | Sundararajan | H04L 47/2441 370/351 |
| 2023/0124148 A1* | 4/2023 | Shribman | G06F 9/45545 709/218 |
| 2023/0148301 A1* | 5/2023 | Goeringer | H04L 49/70 713/168 |

\* cited by examiner

DYNAMIC RESOURCE ALLOCATION FOR NETWORK SECURITY

TECHNICAL FIELD

The subject matter of this disclosure relates in general to the field of computer networking, and more particularly, to systems and methods for dynamic allocation of network security resources and measures to network traffic between end terminals on a network and a network destination, based in part on an independently sourced reputation score of the network destination.

BACKGROUND

Wireless communications systems and computer networks are deployed to provide various telecommunications and data services, including telephony, video, data, messaging, and broadcasts, among others. As networks grow, reliability and security of such networks become important and critical to the underlying purposes for which these networks are utilized.

Various techniques and solutions for network operations and related security issues have been proposed and are currently implemented. However, many of these solutions are fixed and/or are delivered in siloed point solutions at the network edge and may be offered by multiple different vendors.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
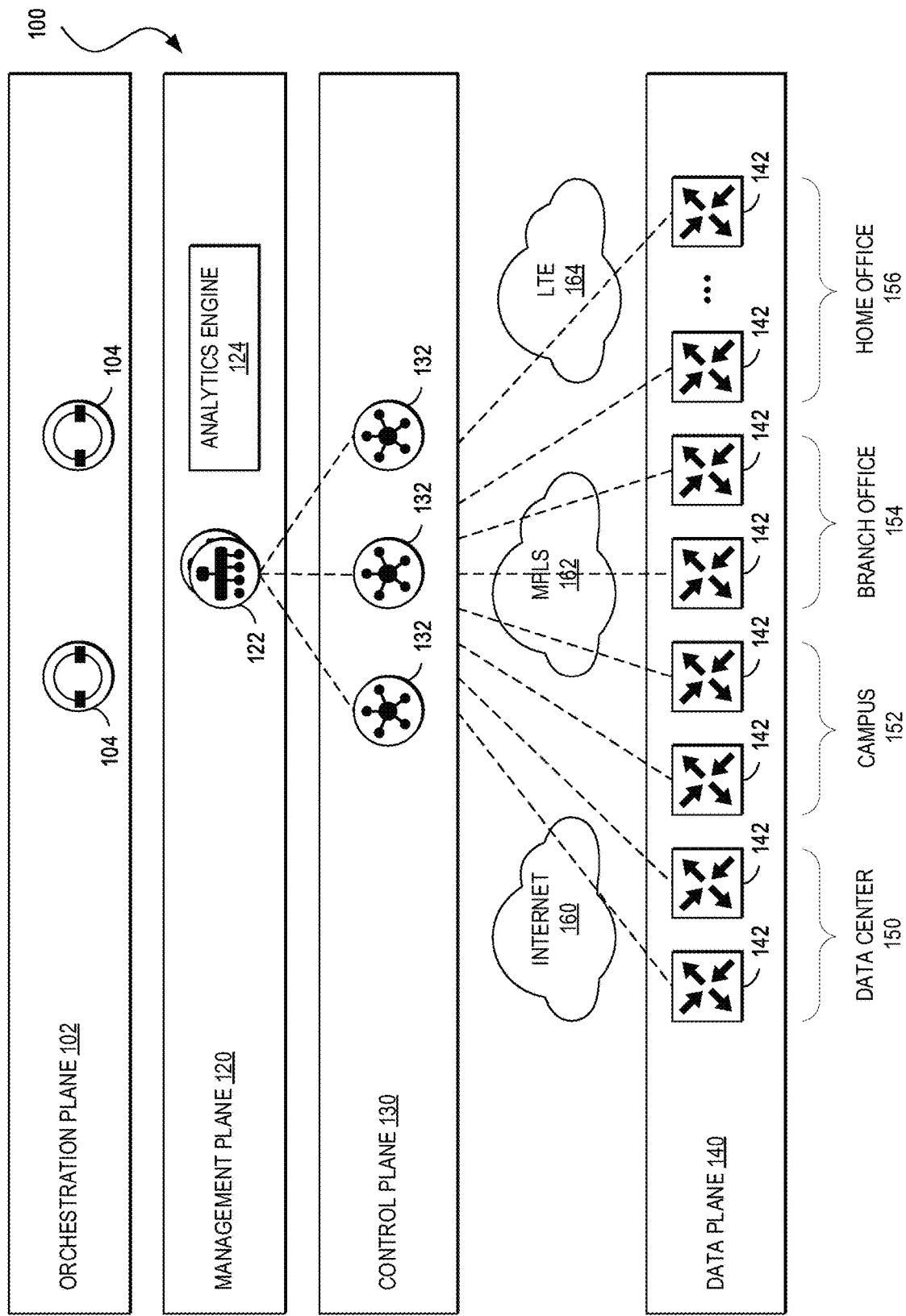
FIG. 1 illustrates an example of a network architecture, according to some aspects of the present disclosure.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details.

In some instances, structures and components are shown in block diagram form in order to avoid obscuring the concepts of the subject matter of this disclosure.

Overview

Disclosed herein are systems, methods, and computer-readable media for dynamic allocation of network security resources and measures to network traffic between end terminals on a network and a network destination, based in part on an independently sourced reputation score of the network destination.

In one aspect, a method includes receiving, at a cloud network controller, a request from an end terminal for information on a network destination; determining, at the cloud network controller, a reputation score for the network destination; determining, at the cloud network controller, one or more security measures to be applied when accessing the network destination, based on the reputation score; and communicating, by the cloud network controller, the one or more security measures to the end terminal, wherein the end terminal communicates the one or more security measures to a third-party security service provider for applying to communications between the end terminal and the network destination.

In some aspects, determining the reputation score includes accessing a reputation score service to obtain the reputation score.

In some aspects, the one or more security measures include one or more of a type of firewall inspection to be applied, deep packet inspection, inspection for one or more types of attack.

In some aspects, the reputation score is inversely proportional to a number or types of the one or more security measures determined to be applied when accessing the network destination.

In some aspects, the cloud network controller applies a Domain Name System Authoritative Source (DNA-AS) to identify the one or more security measures to be applied when accessing the network destination.

In some aspects, the one or more security measures include a multi-touch service where a number of different security measures are applied to network traffic between the end terminal and the network destination.

In some aspects, the one or more security measures include an end point specific security measure.

In some aspects, the endpoint specific security measure is an up to date antivirus software.

In one aspect, a network controller includes one or more memories having computer-readable instructions stored therein and one or more processors. The one or more processors are configured to execute the computer-readable instructions to receive a request from an end terminal for information on a network destination; determine a reputation score for the network destination; determine one or more security measures to be applied when accessing the network destination, based on the reputation score; and communicate the one or more security measures to the end terminal, wherein the end terminal communicates the one or more security measures to a third-party security service provider for applying to communications between the end terminal and the network destination.

In one aspect, one or more non-transitory computer-readable media include computer-readable instructions, which when executed by a network controller, cause the network controller to receive a request from an end terminal for information on a network destination; determine a reputation score for the network destination; determine one or more security measures to be applied when accessing the network destination, based on the reputation score; and communicate the one or more security measures to the end terminal, wherein the end terminal communicates the one or more security measures to a third-party security service provider for applying to communications between the end terminal and the network destination.

Example Embodiments

With the ever-growing utilization of communication networks such as enterprise networks, network security and hance reliable network operation is an on-going concern. As networks grow, they become multi-vendor environments where various solutions are offered by different vendors. Hence coordination of services of multiple vendors and addressing underlying network security issues are important.

Secure Access Edge Service (SASE) is a framework that consolidates numerous networking and security functions traditionally delivered in siloed point solutions at the network edge. This SASE framework is fundamentally changing security architectures and how security services are delivered. For example, SASE allows customers (e.g., organizations using an enterprise network) to select non-traditional security vendors (a SASE service provider) for ensuring the security of their network.

Enterprise network providers often provide various network security solutions to their customers. For example, Cisco, Inc. of San Jose, CA offers a solution referred to as Umbrella. Umbrella has the advantage of linking the vast array of security intelligence solution (e.g., Talos), allowing domains (may also be referred to as network destinations) to be given a reputation score. Customers may select to use services of enterprise network providers such as Cisco, Inc. of San Jose, CA and select a third-party SASE provider for their network security needs, resulting in a multi-vendor environment. This introduces inefficiencies in ensuring network security. First, many of the security services and functionalities offered by third-party SASE providers are fixed (e.g., same set of security solutions are applied to network traffic to and from all network destinations). Second, security and threat intelligence available via the enterprise network provider cannot currently be provided to or harmonized with the services offered by the third-party SASE providers.

The example embodiments described in this disclosure address the above deficiencies by allowing network intelligence gathered by solutions offered by enterprise network providers (independently sourced reputation score of a network destination) to be communicated to third-party SASE providers. This network and security intelligence can allow the third-party SASE providers to dynamically apply destination specific network security measure(s) to network traffic between an end terminal and a network destination. As will be described, the provided network and security intelligence (which can be destination and/or end terminal(s) specific) are communicated to the requesting end terminal(s) by the security service of the enterprise network provider after Domain Name System (NDS) look up of the destination by the end terminal(s).

The present disclosure begins with a description of a number of example network architectures and environments in which the concepts described herein may be applied.

An end device or an end terminal can include devices such as a mobile phone, router, tablet computer, laptop computer, tracking device, wearable device (e.g., a smart watch, glasses, an XR device, etc.), Internet of Things (IoT) device, a vehicle (or a computing device of a vehicle), and/or another device used by a user to communicate over a wireless communications network. In some instances, a computing device can be referred to as user equipment (UE), such as when referring to a wireless device configured to communicate using 5G/New Radio (NR) or other telecommunications standard. In some examples, a computing device can be referred to as an endpoint.

FIG. 1 illustrates an example of a network architecture, according to some aspects of the present disclosure. An example of an implementation of the network architecture 100 is the Cisco® SDWAN architecture. However, one of ordinary skill in the art will understand that, for the network architecture 100 and any other system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane 102 can assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122 and an analytics engine 124. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.) using, in part, network and data intelligence gathered by the analytics engine 124. Alternatively, or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each edge network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
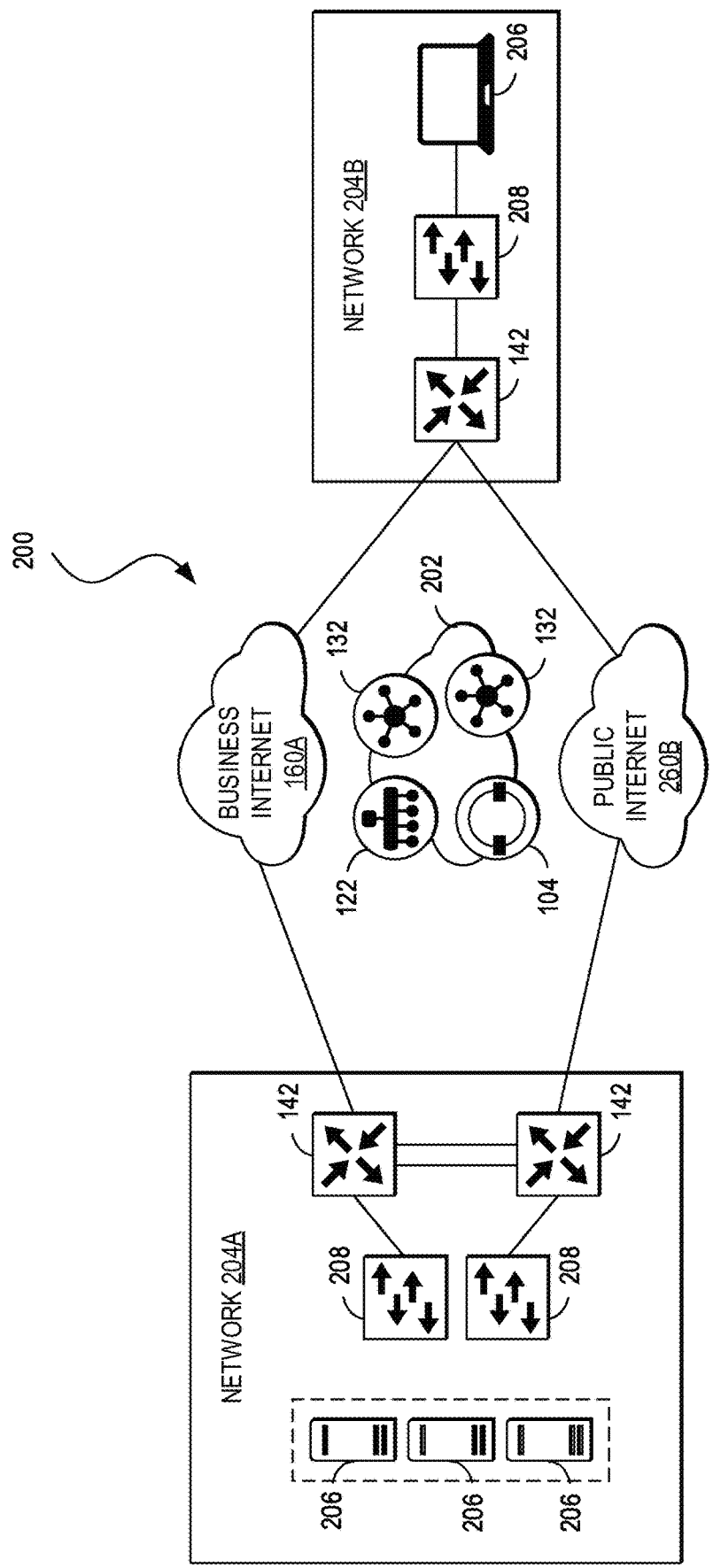
FIG. 2 illustrates an example of a network topology, according to some aspects of the present disclosure.

FIG. 2 illustrates an example of a network topology, according to some aspects of the present disclosure. Network topology 200 shows various aspects of the network architecture 100. The network topology 200 can include a management network 202, a pair of network sites 204A and 204B (collectively, 204) (e.g., the data center(s) 150, the campus network(s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints (end terminals or end devices) 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Various types of protocols and communication schemes may be applied for enabling communication of control messages between components of the network architecture 100 (e.g., an Overlay Management Protocol (OMP), which may be used to transmit OMP messages back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

Furthermore, end terminals may connect to network architecture via any known or to be developed communication scheme such as Virtual Private Network (VPN) connection, etc.

With various non-limiting examples of architecture(s) and operation of SD-WANs described with reference to FIGS. 1 and 2, next a cloud-based security service that can be applied as a security layer to manage security of a network architecture (e.g., a SD-WAN) such as the network architecture 100 and communications to and from remotely connected end terminals will be described with reference to FIGS. 3 and 4.

Figure 3:
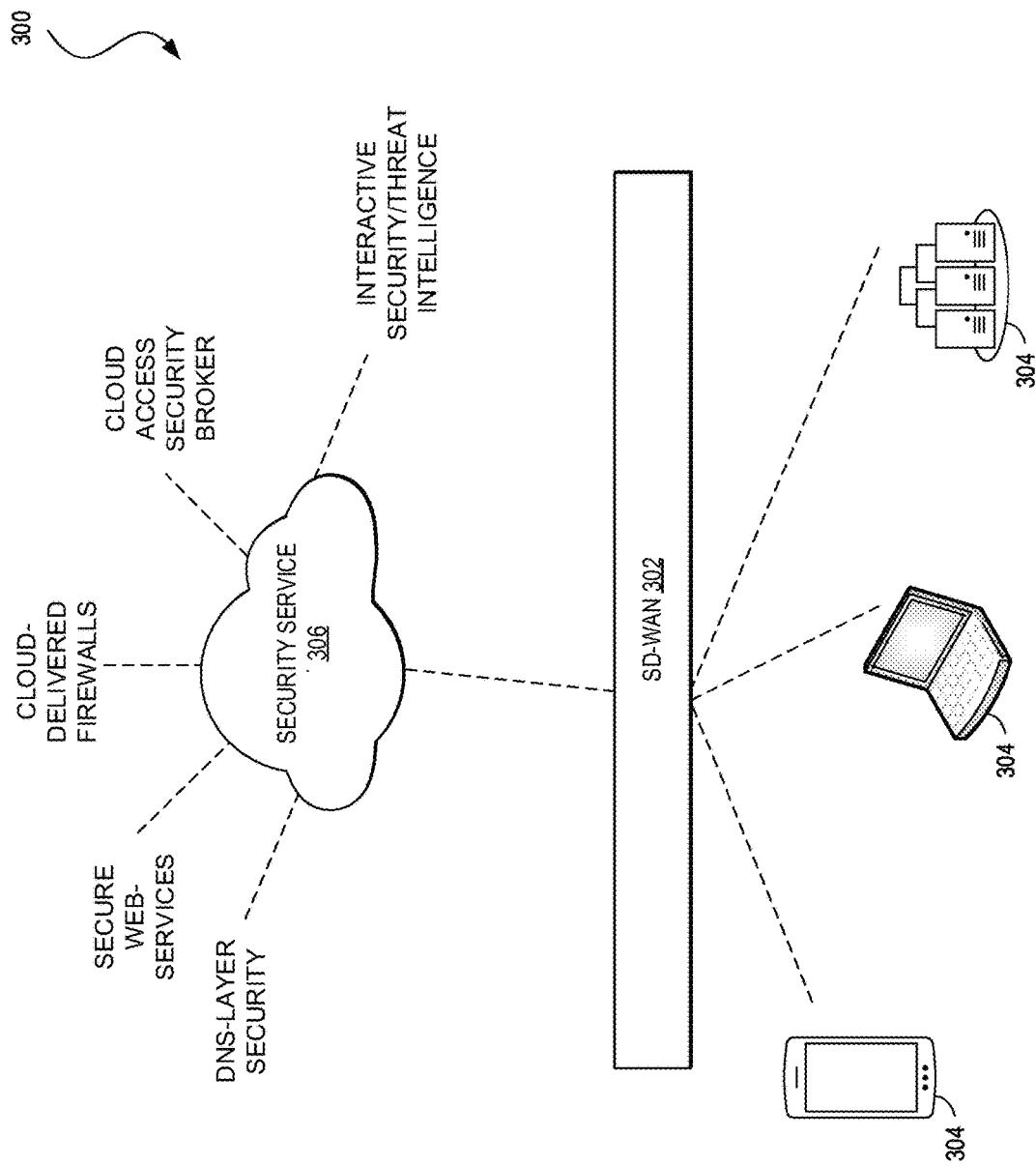
FIG. 3 illustrates an example network architecture with a cloud-based security layer, according to some aspects of the present disclosure.

FIG. 3 illustrates an example network architecture with a cloud-based security layer, according to some aspects of the present disclosure. Environment 300 includes SD-WAN 302, which can be the same as the non-limiting examples described above with reference to FIGS. 1 and 2. Hence, SD-WAN 302 will not be described further. End terminals 304 may be connected to SD-WAN 302 via various known or to be developed wired and/or wireless communication schemes (e.g., VPN, ethernet, etc.). End terminals 304 may be the same as those described above with reference to FIGS. 1 and 2 including, but not limited to, mobile devices, laptops, servers (data centers), etc.

Environment 300 also includes cloud-based security service 306 that can provide several security related functionalities and services to end terminals 304 connected to SD-WAN 302. As shown, such services include, but are not limited to, Domain Name System (DNS)-layer security, secure web-services, cloud-delivered firewalls, cloud access security broker, interactive threat/security intelligence, etc. A non-limiting example of cloud-based network security service 306 is the Cisco Umbrella, described above.

As noted, many SD-WAN users and customers decide to use, in addition to security services 302, a third-party SASE provider to ensure proper security measures are applied to connected end terminals accessing various network destinations (e.g., outside a private enterprise network and over the public internet). Moreover, many such third-party SASE providers apply a fixed security measure to connection requests to and from connected end terminals. For example, Deep Packet Inspection (DPI), a particular type of Firewall, and/or SQL injection attack inspection, to name a few, may be applied to all network traffic between an end terminal 304 and any network destination over the public internet. In other words, the one or more security measures applied by the third-party SASE provider is fixed, regardless of the security and reliability of the specific network destination to which access is requested.

Figure 4:
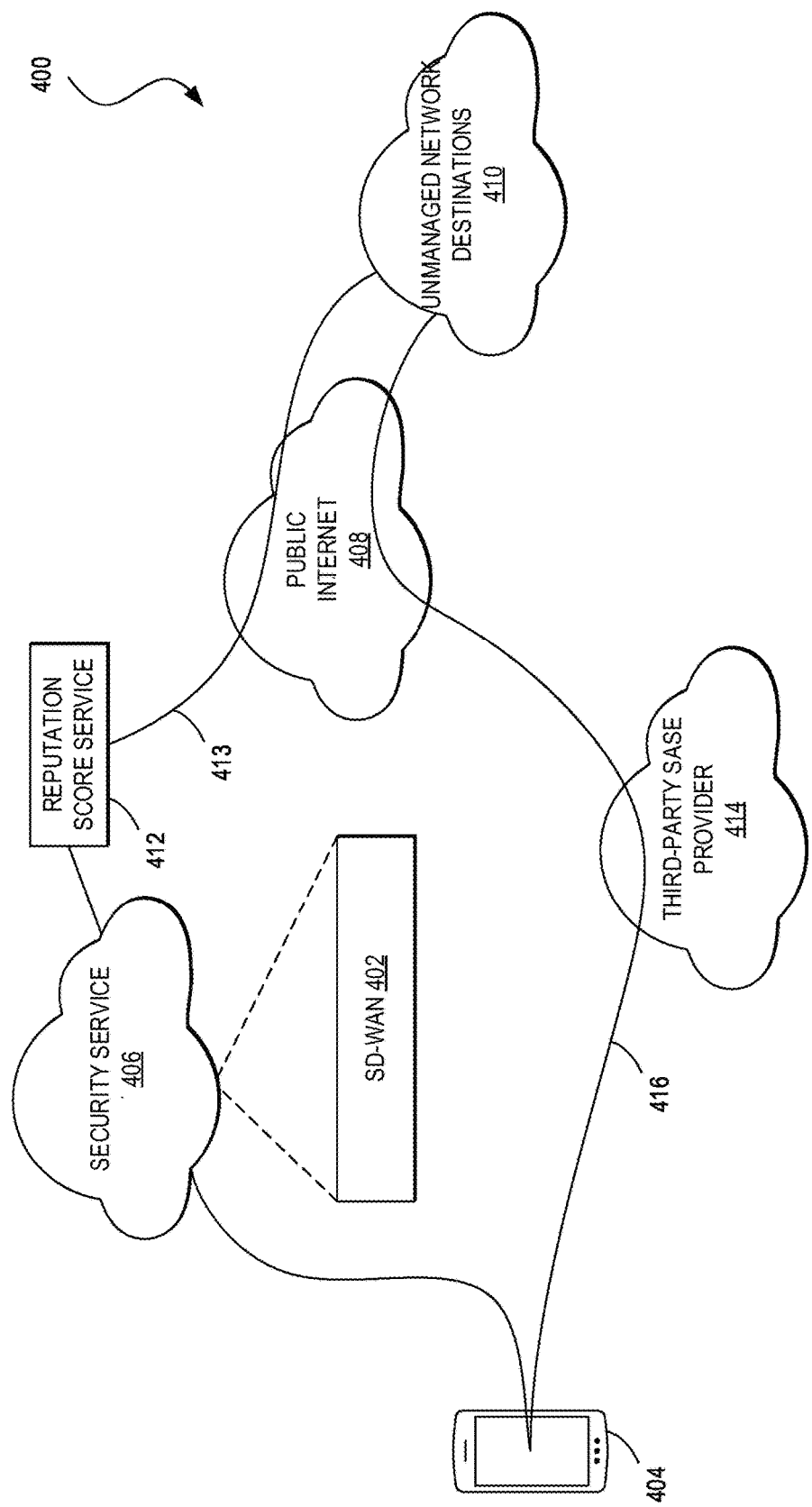
FIG. 4 illustrates an example network environment including a third-party SASE provider, according to some aspects of the present disclosure.

FIG. 4 illustrates an example network environment including a third-party SASE provider, according to some aspects of the present disclosure. As shown in FIG. 4, environment 400 includes SD-WAN 402, which may be the same as SD-WAN 302 and hence will not be described further. End terminal 404 may be the same as any one of end terminals 304 of FIG. 3 and/or any of other example end terminals described above with reference to FIGS. 1 and 2 and hence will not be described further. Security service 406 is the same as security service 306 of FIG. 3 and hence will not be described further.

In environment 400, end terminal 404 may attempt to access over the public internet 308, a network destination (e.g., a website, a network, a device) that is not managed by provider of SD-WAN 402. Such network destination may belong to a group of network destinations referred to as unmanaged network destinations 410. Such network destination can be a reputable network destination (e.g., a known and reliable website such as www.cisco.com) or may not be a trustworthy destination (e.g., a website with known suspicious activity, a website located in an untrustworthy location such as a hostile state, etc.).

As mentioned previously, a provider of SD-WAN 402 and security service 406 may have other services that monitor and rate the level of trustworthiness of unmanaged network destinations. Such service may be referred to as reputation score service 412. One non-limiting example of reputation score service 412 is Cisco Talos Intelligence service that may utilize any known or to be developed method or process for gathering intelligence on various network destinations over the public internet 408 (using example path 413) and determining a reputation score for the network destinations. Such reputation score may be a numerical number within a defined range (e.g., 0-5, 0-10, 0-50, 0-100, etc.). For example, the higher the reputation score, the more reliable would be the corresponding network destination and the lower the reputation score, the less reliable would be that corresponding network destination.

Once the end terminal 404 is authenticated/connected to the SD-WAN 402 via the security service 406, the end terminal 404 may select a particular destination among the unmanaged network destinations 410 to access (e.g., a website). In doing so, the end terminal 404 may submit and resolve a DNS query with the security service 406 for the network destination. In response, the security service 406 may access the reputation score service 412 and retrieve a corresponding reputation score for the network destination requested by the end terminal 404. The security service 406, based on the corresponding reputation score, may determine one or more security measures to be applied when accessing the network destination. This process will be further described below with reference to FIG. 5.

Once the one or more security measures are determined by the security service 406, the one or more security measures may be communicated back to the end terminal 404 via appropriate control signals. The end terminal 404 may then communicate the one or more security measures to the third-party SASE provider 414. The third-party SASE provider 414 may then chain and apply the security measures to network traffic between the end terminal 404 and the network destination from among the unmanaged network destinations 410. FIG. 4 illustrates an example traffic path 416 between the end terminal 404 and the network destination targeted from among the unmanaged network destinations 410.

Figure 5:
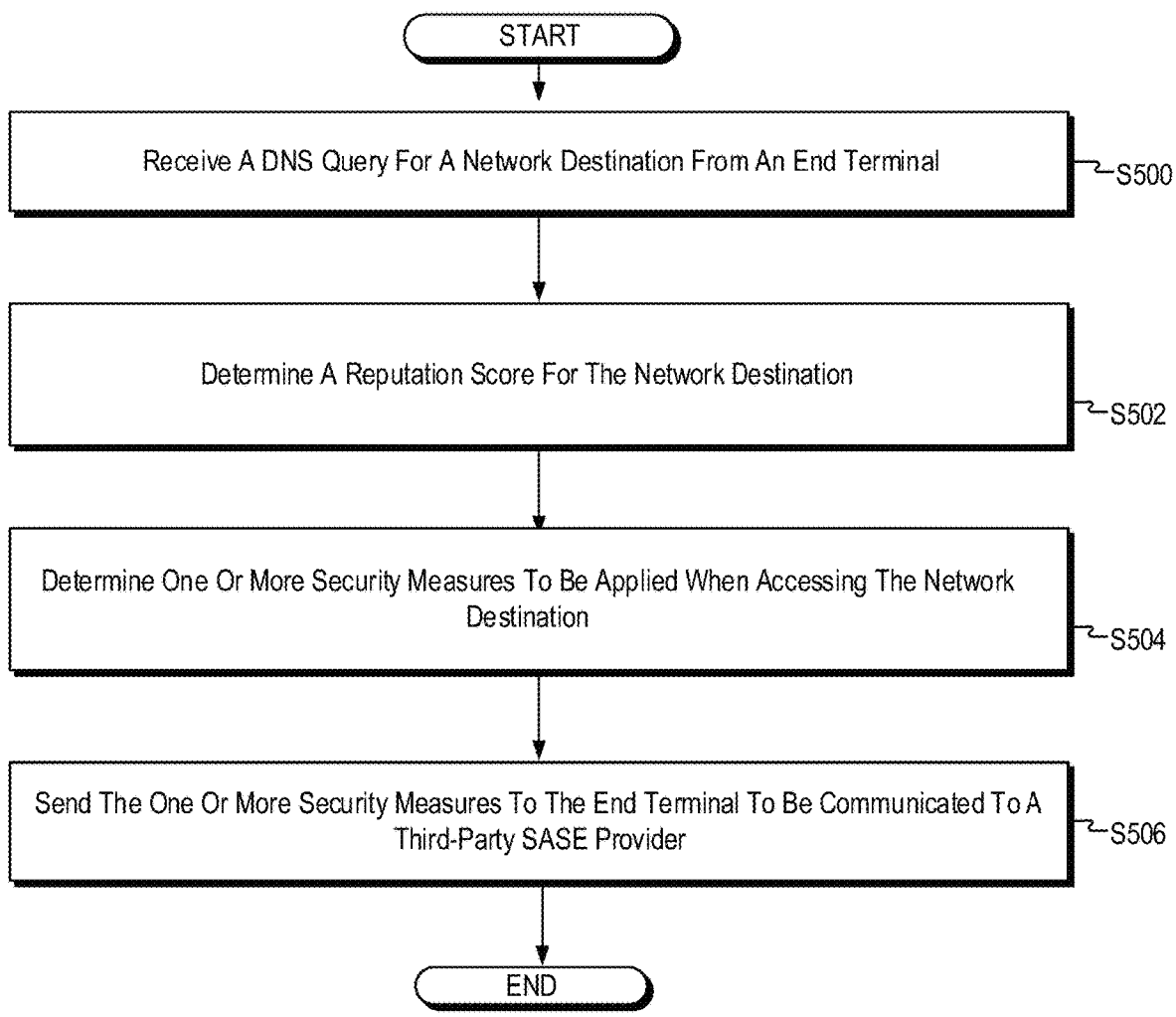
FIG. 5 illustrates an example process for enabling third-party SASE providers to dynamically allocate resources for applying security measures to end terminals, according to some aspects of the present disclosure.

FIG. 5 illustrates an example process for enabling third-party SASE providers to dynamically allocate resources for applying security measures to end terminals, according to some aspects of the present disclosure. FIG. 5 will be described from the perspective of security service 406. However, it should be understood that security service 406 may be implemented as a network controller (may also be referred to as a cloud network controller) where computer-readable instructions stored on one or more associated memories may be executed by one or more associated processors to implement the functionalities of FIG. 5. In describing steps of FIG. 5, references may be made to any one of FIGS. 1-4 and components thereof described above.

At S500, the security service 406 may receive a request from an end terminal for information on a network destination. For example, the security service 406 may receive a DNS query from the end terminal 404 for a network destination. This DNS query may be for purposes of resolving a DNS look up for the network destination such as a domain, a web site, a server, etc. As described, the network destination may be any one or more destinations from among the unmanaged network destinations 410.

At S502, the security service 406 determines a reputation score for the network destination requested by the end point 404 at S500. In one example and as described above, the security service 406 may determine the reputation score by accessing the reputation score service 412 and receiving a reputation score for the network destination.

At S504, the security service 406 determines one or more security measures to be applied when accessing the network destination, based on the reputation score. Examples of various security measures include, but are not limited to, type of firewall inspection, DPI, common threat types, Secure Web Gateway (SWG), inspection for Cross Site Scripting (CSS) attack, inspection for SQL attack, application of one or more antivirus software at the end terminal 404 (such antivirus software may be an endpoint specific security measure), etc. Accordingly, the one or more security measures determined can be network destination specific and depends For example, the network may have a score of 3 out of 10, which may be indicate that the network destination is not very reliable. Therefore, the security service 406 may determine that multiple security measures should be applied (a multi-touch service process), where two or more of the available security measures may be applied to network traffic between the end terminal 404 and the network destination (e.g., DPI, SWG, and/or SQL attack inspection).

In another example, the network destination may have a score of 8 out of 10 indicating that the network destination is very reliable. Accordingly, only one security measure (e.g., a particular type of firewall) may be selected to be applied to the underlying network traffic. In another example, there may be no security measures selected because the network destination is very reliable (e.g., when the network destination has a score of 10 out of 10). In another example, the security service 406 may determine that the network destination would still be very unreliable even if all available security measures are applied (e.g., when the network destination has a score of 0 out of 10).

The security measure(s) to be applied to a network destination may be inversely proportional to the corresponding reputation score.

Accordingly, at S504, the security service 406 determines the one or more security measures to be "recommended" to the end terminal 404 to be applied to the underlying network traffic when communicating with the network destination.

The process at S504 provides a destination specific security measures to be determined and recommended to the end terminal 404. In other words, the security measures are determined dynamically and can be adjusted based on the reputation score and trustworthiness of the underlying network destination.

In some examples, the security service 406 may have a look up table that matches security measure(s) to reputation scores. For example, any network destination having a reputation score of 3 may receive a set of three recommended security measures (e.g., DPI, SWG, and/or SQL attack inspection), a reputation score of 5 out of 10 may have a corresponding security measure (e.g., DPI), etc. In another example, security service 406 may adaptively learn which security measure(s) are to be recommended for which reputation scores. For example, one or more machine learning models (e.g., a feed forward neural network) may be trained and continuously updated to identify and optimize the selected security measure(s) for different network destinations.

DNS-Authoritative Source (DNS-AS) is a method where a DNS server (e.g., the security service 406) can return customized metadata to the end terminal 404. In some aspects of the present disclosure, DNS-AS is applied by the security service 406 to return threat intelligence and security measures details about the domain to the end terminal 404, which will then be relayed to the third-party SASE provider 414 to deliver the selected security measure(s).

At S506 and after determining the one or more security measures at S504, the security service 406 may send the determined one or more security measures and the reputation score to the end terminal 404. Upon receiving the one or more security measures, the end terminal 404 may select to make (or not to make) a connection to the network destination through the third-party SASE provider 414. For example, if the network destination has a reputation score of 0 out of 10, then the end terminal 404 may select not to establish a connection to the network destination. Before the connection is made, the end terminal 404 communicates with the third-party SASE provider 414 through a control channel and provides the set of one or more security functions to the third-party SASE provider 414 for the given network destination, along with a standard formatted threat score. The third-party SASE, provider 414 may then apply the one or more security, measures to network traffic between the end terminal 404 and the network destination. For example, the third-party SASE provider 414 may chain the one or more security measures before applying it to the network traffic between the end terminal 404 and the network destination.

Figure 6:
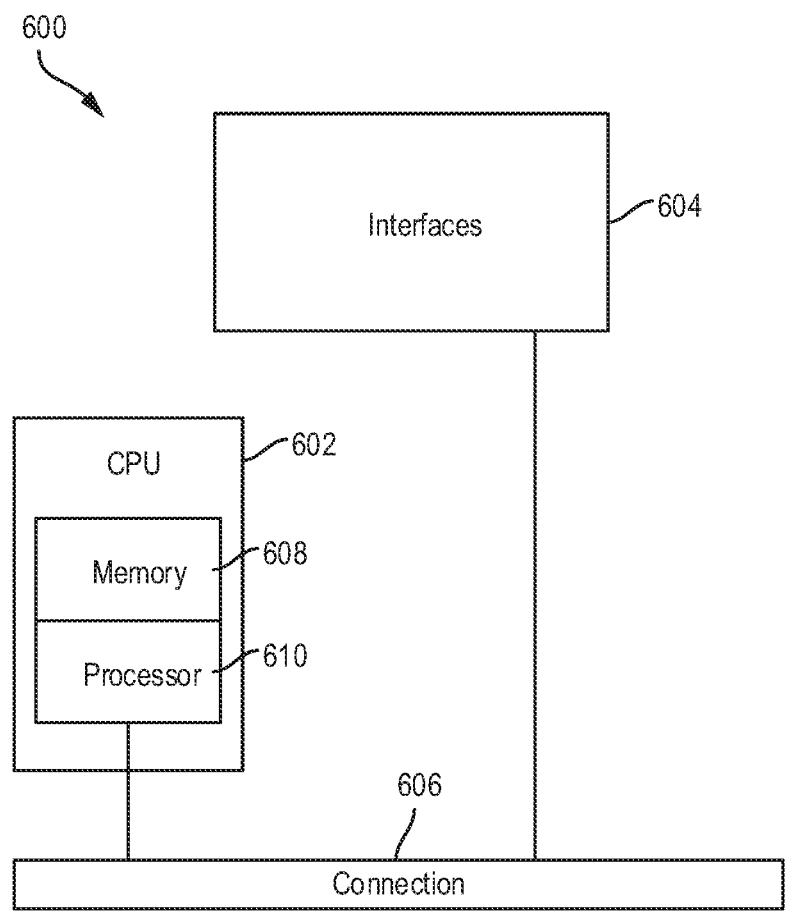
FIG. 6 illustrates an example of a network device, according to some aspects of the present disclosure.

FIG. 6 illustrates an example of a network device, according to some aspects of the present disclosure. Network device 600 can be a switch, a router, a network appliance, etc., including a network appliance implementing the functionalities of end terminal 404, security service 406, reputation score service 412, among other components described above with reference to FIGS. 1-4. The network device 600 can include a master central processing unit (CPU) 602, interfaces 604, and a bus 606 (e.g., a PCI bus). When acting under the control of appropriate software or firmware, the CPU 602 can be responsible for executing packet management, error detection, and/or routing functions. The CPU 602 preferably accomplishes all these functions under the control of software including an operating system and any appropriate applications software. The CPU 602 may include one or more processors 608 such as a processor from the Motorola family of microprocessors or the MIPS family of microprocessors. In an alternative embodiment, the processor 608 can be specially designed hardware for controlling the operations of the network device 600. In an embodiment, a memory 610 (such as non-volatile RAM and/or ROM) can also form part of the CPU 602. However, there are many different ways in which memory could be coupled to the system.

The interfaces 604 can be provided as interface cards (sometimes referred to as line cards). The interfaces 604 can control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 604 may include ports appropriate for communication with the appropriate media. In some cases, the interfaces 604 may also include an independent processor and, in some instances, volatile RAM. The independent processors may control communication intensive tasks such as packet switching, media control, and management. By providing separate processors for the communication intensive tasks, the interfaces 604 may allow the CPU 602 to efficiently perform routing computations, network diagnostics, security functions, and so forth.

Although the system shown in FIG. 6 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 600.

Regardless of the network device's configuration, it may employ one or more memories or memory modules (including the memory 610) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 7:
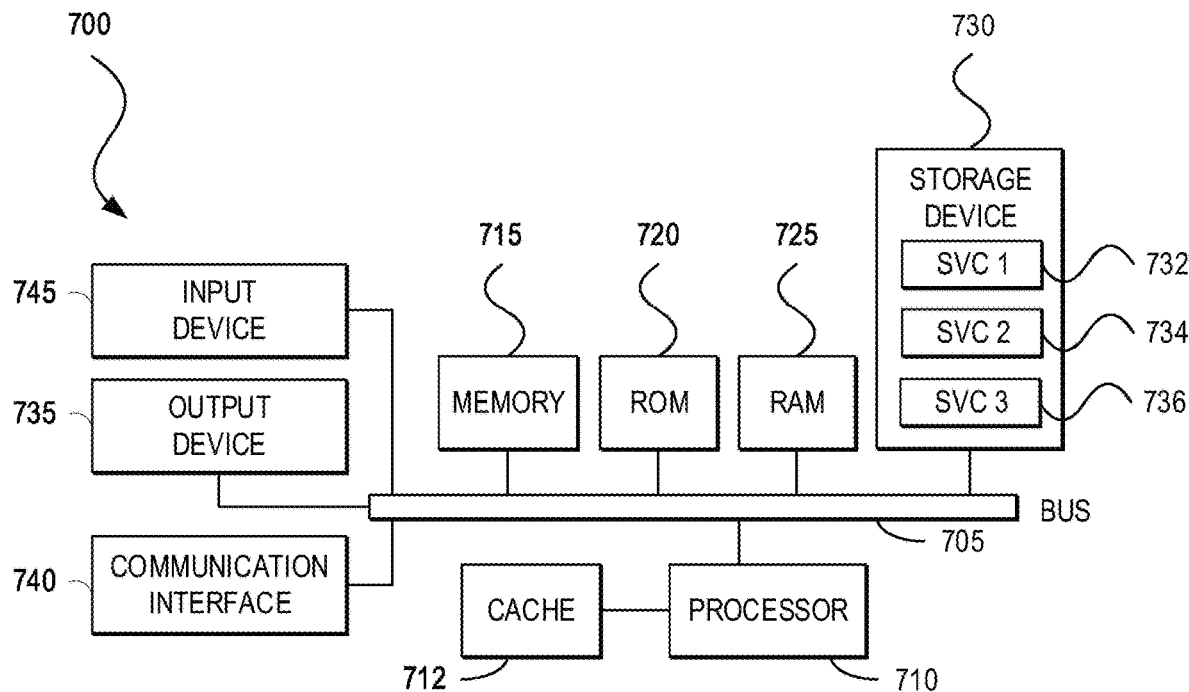
FIG. 7 illustrates an example of a bus computing system, according to some aspects of the present disclosure.

FIG. 7 illustrates an example of a bus computing system, according to some aspects of the present disclosure. Computing system 700 can be utilized as part of any one of the network components described above with reference to FIGS. 1-4, including end terminal 404, security service 406, and reputation score service 412. Components of the computing system 700 are in electrical communication with each other using a bus 705. The computing system 700 can include a processing unit (CPU or processor) 710 and a system bus 705 that may couple various system components including the system memory 715, such as read only memory (ROM) 720 and random access memory (RAM) 725, to the processor 710. The computing system 700 can include a cache 712 of high-speed memory connected directly with, in close proximity to, or integrated as part of the processor 710. The computing system 700 can copy data from the memory 715, ROM 720, RAM 725, and/or storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module (services), such as services SVC 1 732, SVC 2 734, and SVC 3 736 stored in the storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

The storage device 730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 730 can include the software SVCs 732, 734, and 736 for controlling the processor 710. Other hardware or software modules are contemplated. The storage device 730 can be connected to the system bus 705. In some embodiments, a hardware module that performs a particular function can include a software component stored in a computer-readable medium in connection with the necessary hardware components, such as the processor 710, bus 705, output device 735, and so forth, to carry out the function.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   receiving, at a cloud network controller, a request from an end terminal for information on a network destination;
   determining, at the cloud network controller, a reputation score for the network destination;
   determining, at the cloud network controller, one or more security measures to be applied when accessing the network destination, based on the reputation score, wherein the reputation score is inversely proportional to a number or types of the one or more security measures; and
   communicating, by the cloud network controller, the one or more security measures to the end terminal, wherein the end terminal communicates the one or more security measures to a third-party security service provider for applying to communications between the end terminal and the network destination.

2. The method of claim 1, wherein determining the reputation score comprises:
   accessing a reputation score service to obtain the reputation score.

3. The method of claim 1, wherein the one or more security measures include one or more of a type of firewall inspection to be applied, deep packet inspection, inspection for one or more types of attack.

4. The method of claim 1, wherein the cloud network controller applies a Domain Name System Authoritative Source (DNA-AS) to identify the one or more security measures to be applied when accessing the network destination.

5. The method of claim 1, wherein the one or more security measures include a multi-touch service where a number of different security measures are applied to network traffic between the end terminal and the network destination.

6. The method of claim 1, wherein the one or more security measures include an endpoint specific security measure.

7. The method of claim 6, wherein the endpoint specific security measure is an up to date antivirus software.

8. A network controller comprising:
   one or more memories having computer-readable instructions stored therein; and
   one or more processors configured to execute the computer-readable instructions to:
   receive a request from an end terminal for information on a network destination;
   determine a reputation score for the network destination;
   determine one or more security measures to be applied when accessing the network destination, based on the reputation score, wherein the reputation score is inversely proportional to a number or types of the one or more security measures; and
   communicate the one or more security measures to the end terminal, wherein the end terminal communicates the one or more security measures to a third-party security service provider for applying to communications between the end terminal and the network destination.

9. The network controller of claim 8, wherein the reputation score is determined by accessing a reputation score service to obtain the reputation score.

10. The network controller of claim 8, wherein the one or more security measures include one or more of a type of firewall inspection to be applied, deep packet inspection, inspection for one or more types of attack.

11. The network controller of claim 8, wherein the network controller is configured to apply a Domain Name System Authoritative Source (DNA-AS) to identify the one or more security measures to be applied when accessing the network destination.

12. The network controller of claim 8, wherein the one or more security measures include a multi-touch service where a number of different security measures are applied to network traffic between the end terminal and the network destination.

13. The network controller of claim 8, wherein the one or more security measures include an endpoint specific security measure, the endpoint specific security measure being an up to date antivirus software.

14. One or more non-transitory computer-readable media comprising computer-readable instructions, which when executed by a network controller, cause the network controller to:
  receive a request from an end terminal for information on a network destination;
  determine a reputation score for the network destination;
  determine one or more security measures to be applied when accessing the network destination, based on the reputation score, wherein the reputation score is inversely proportional to a number or types of the one or more security measures; and
  communicate the one or more security measures to the end terminal, wherein the end terminal communicates the one or more security measures to a third-party security service provider for applying to communications between the end terminal and the network destination.

15. The one or more non-transitory computer-readable media of claim 14, wherein the reputation score is determined by accessing a reputation score service to obtain the reputation score.

16. The one or more non-transitory computer-readable media of claim 14, wherein the one or more security measures include one or more of a type of firewall inspection to be applied, deep packet inspection, inspection for one or more types of attack.

17. The one or more non-transitory computer-readable media of claim 14, wherein the network controller is configured to apply a Domain Name System Authoritative Source (DNA-AS) to identify the one or more security measures to be applied when accessing the network destination.

18. The one or more non-transitory computer-readable media of claim 14, wherein the one or more security measures include a multi-touch service where a number of different security measures are applied to network traffic between the end terminal and the network destination.

19. The one or more non-transitory computer-readable media of claim 14, wherein the one or more security measures include an endpoint specific security measure, the endpoint specific security measure being an up to date antivirus software.

* * * * *